United States Patent [19]
Gramse, Jr.

[11] Patent Number: 5,870,850
[45] Date of Patent: Feb. 16, 1999

[54] RATTLING FISHING LURE

[76] Inventor: Arthur E. Gramse, Jr., 5 Owl La., Mashpee, Mass. 02649

[21] Appl. No.: 780,853

[22] Filed: Jan. 9, 1997

[51] Int. Cl.$^6$ .................................................. A01K 85/00
[52] U.S. Cl. ............................................. 43/42.31
[58] Field of Search ................................ 43/42.31, 42.36, 43/42.06

[56] References Cited

U.S. PATENT DOCUMENTS

| | | | |
|---|---|---|---|
| 2,659,176 | 11/1953 | Wenger | 43/42.31 |
| 3,705,465 | 12/1972 | Charney | 43/42.31 |
| 3,947,989 | 4/1976 | Bart | 43/42.31 |
| 4,918,854 | 4/1990 | Webre | 43/42.31 |
| 5,001,856 | 3/1991 | Gentry | 43/42.31 |
| 5,070,639 | 12/1991 | Pippert | 43/42.31 |
| 5,134,799 | 8/1992 | Trnka | 43/42.22 |

*Primary Examiner*—Kurt Rowan
*Attorney, Agent, or Firm*—Lahive & Cockfield, LLP

[57] ABSTRACT

A fish lure comprising a body having a tubular sidewall with a front opening and a rear opening, a front face and a rear face, which in combination define an interior cavity, the front face being recessed with respect to the front opening of the tubular sidewall so as to form a pocket, a base of the pocket being formed by the front face and a wall of the pocket being formed by the tubular sidewall; means disposed within the pocket for attaching fishing line; a hook assembly pivotally attached to the rear face; and a plurality of loose weights disposed within the interior cavity of the body. The lure provides fish-attracting movements and sounds.

19 Claims, 1 Drawing Sheet

RATTLING FISHING LURE

BACKGROUND OF THE INVENTION

This invention is related to the field of fishing lures, and in particular, to a fishing lure which provides fish-attracting movements and sounds.

SUMMARY OF THE INVENTION

In one aspect, the present invention provides a fish lure comprising a body having a tubular sidewall with a front opening and a rear opening, a front face and a rear face, which in combination define an interior cavity, the front face being recessed with respect to the front opening of the tubular sidewall so as to form a pocket, a base of the pocket being formed by the front face and a wall of the pocket being formed by the tubular sidewall; means disposed within the pocket for attaching fishing line; a hook assembly pivotally attached to the rear face; and a plurality of loose weights disposed within the interior cavity of the body.

DETAILED DESCRIPTION

Figure 1:
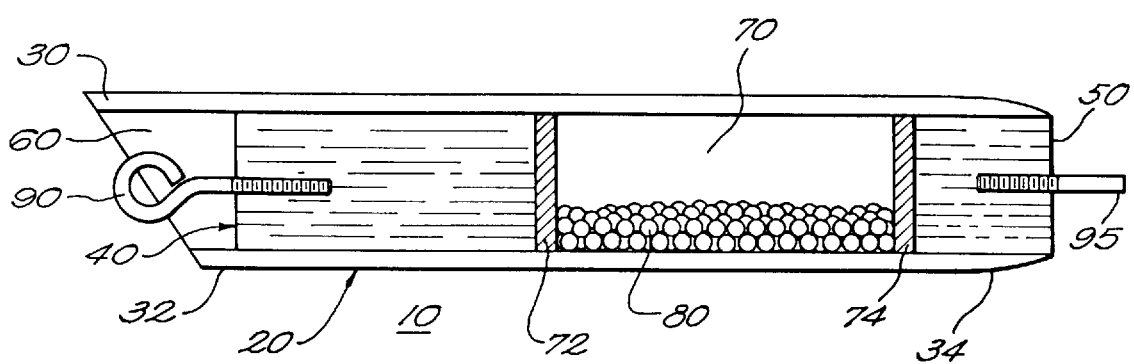
FIG. 1 shows a view in longitudinal cross-section of one embodiment of a lure according to the present invention.

The present invention provides a fishing lure which is effective at catching fish, is simple and inexpensive to make, and which can be easily modified to maximize performance and to achieve a variety of fish-attracting effects.

The general construction of one embodiment of a lure (10) according to the present invention is shown in cross-section in FIG. 1. The body (20) of the lure extends along a longitudinal axis and comprises a sidewall (30), which in combination with the front (40) and rear (50) faces, defines an interior cavity (70) which has front and rear ends (72 and 74, respectively). The sidewall has front and rear ends (32 and 34, respectively). The interior cavity contains a plurality of loose weights (80). The front face 40, together with the front end (32) of the sidewall 30, defines a pocket (60). The pocket further includes an eyelet (90) or other means for attaching fishing line. The rear face includes an eyelet or other means (95) for attaching a hook assembly (hook assembly not shown).

The fishing lure of the present invention is configured to provide at least one of he following features: a rattling sound due to movement of loose weights in an interior cavity; a "porpoising" or "breaching" motion when drawn through the water (i.e., the lure, when drawn close to the water surface, may "skip" briefly out of the water and through the air before reentering the water); and a "popping" sound due to the impact of the front face on the water surface, a shiftable weight distribution which in the casting phase maximizes casting distance and in the retrieval or fishing phase results in optimal weight distribution for fish attracting action.

In preferred embodiments, the interior cavity (70), which contains a plurality of loose weights, occupies essentially the entire length of the body of the lure. As used herein, "length of the body" means the length of the lure body along a longitudinal axis. However, in other preferred embodiments, the cavity occupies substantially less than the entire length of the fish lure body. For example, the cavity may occupy as little as ten percent of the length of the body or as much as twenty-five, fifty, seventy-five or ninety percent of the length of the body. In preferred embodiments the length of the cavity (i.e., the length of the cavity along the longitudinal axis of the body) is less than about ten, twenty-five, fifty, seventy-five, or ninety percent of the length of the body. In particularly preferred embodiments, the cavity is more than thirty percent of the length of the body but is less than eighty percent of the length of the body. As can be seen from the discussion below, the length of the cavity can be decreased by thickening the front and rear faces or by inserting additional solid members inside the body to diminish the size of the cavity. For example, in the case of a cylindrical tubular sidewall, a solid cylinder of a suitable smaller diameter, for example, a wooden dowel, can be inserted inside the tubular sidewall to decrease the size of the cavity. The placement of the cavity with respect to the longitudinal axis of the fish lure body can also be varied. For example, the cavity may be symmetrically or asymmetrically disposed about the longitudinal axis of the body, and the cavity may have a regular or an irregular shape. For example, in preferred embodiments, the cavity is substantially cylindrical, and the cylindrical cavity is essentially coaxial with the longitudinal axis of the body of the lure. Such an arrangement provides for optimal balance of the lure.

In embodiments in which the cavity is substantially shorter than the length of the body, the cavity can be positioned midway between the front and rear face, or it can be positionally biased toward the front face or the rear face. The position of the cavity may be adjusted to optimize the balance of the fishing lure. In preferred embodiments, at least forty percent and more preferably sixty or seventy percent of the length or volume of the cavity is disposed behind the middle of the body. In preferred embodiments, the volume of the cavity comprises at least ten, twenty-five, fifty, seventy-five, or ninety percent of the volume of the fish lure body. In other embodiments the volume of the cavity is less than fifty percent of the volume of the fish lure body. In preferred embodiments, all or part of the internal surface of the cavity is lined with a material which will result in a rattling noise when the loose weights strike against it. In selected embodiments, the front and rear ends of the cavity are lined with a felt pad 76 and 78.

The tubular sidewall should be made of a material which is durable and resists water, including salt water. The material should not be brittle, and should be capable of withstanding repeated impacts (e.g., the force of a fish striking at or biting the lure). The material for the sidewall may be rigid, or it may be somewhat flexible, although in preferred embodiments, the body is substantially inflexible. In certain embodiments, the sidewall is constructed of glass or metal, but in preferred embodiments, the sidewall is made of a plastic material. In a particularly preferred embodiment, the sidewall comprises polyvinyl chloride (PVC). The sidewall (and the body) can be coated with materials which affect characteristics such as weight, color, durability, water resistance, and the like. Materials which can be used as coatings to achieve these aims are known to the skilled artisan. For example, epoxy may be used as a protective coating, which, when fully cured, is very durable, provides a smooth finish, and can serve as a means to attach other items to the surface of the lure. Furthermore, as described in more detail below, the surface of the lure can be coated with paint or color glitter, in which case the epoxy coating serves to protect the paint or glitter, and causes the glitter to adhere to the body of the lure.

Returning to the description of the sidewall, the dimensions of the sidewall can be selected to achieve various objects of the invention. The length of the sidewall (along the longitudinal axis of the body) is selected according to the desired length of the lure body. In some embodiments, the sidewall length is at least one, three, five, seven, or ten inches. In certain embodiments, the length of the sidewall is less than forty, thirty, twenty, fifteen ten or five inches. In a preferred embodiment, the length of the sidewall is not less than two inches and not more than six inches. The cross-sectional form of the sidewall when viewed perpendicular to the longitudinal axis (hereinafter referred to simply as "cross-section" unless otherwise stated) may be selected to achieve various objects of the invention. The cross-sectional form of the sidewall may be circular, or can be any regular or irregular shape, including regular and irregular polygons and curves. However, all cross-sectional shapes will be referred to herein as forming a "tubular" sidewall. In preferred embodiments, the cross-sectional shape of the sidewall is substantially regular. In a particularly preferred embodiment, the sidewall has a substantially circular cross-section. The cross-sectional shape of the sidewall may vary or may be held substantially constant along the longitudinal axis of the lure body. In preferred embodiments, the cross-sectional shape of the sidewall is substantially constant throughout the length (along the longitudinal axis) of the sidewall. The sidewall may be constructed in a single piece, or may be constructed from two or more pieces which are subsequently secured to form the whole. The inside and outside diameters of the sidewall may also be varied, for example to vary the size of the lure or the volume of the interior cavity. The inside and outside diameters of the sidewall can also be varied along the length of the longitudinal axis. In a preferred embodiment, the outside diameter of the sidewall has a substantially constant dimension along the longitudinal axis. It will be appreciated that the thickness of the sidewall can also be varied, for example, to taper one end of the lure body, as described in Example 1, below. In certain embodiments, the outside diameter of the sidewall is at least one-half, one, two, three or five inches. In a preferred embodiment, the outside diameter of the sidewall is between three-eighths inch and one inch. Furthermore, in preferred embodiments, the ratio of the body length along the longitudinal axis to the diameter of the sidewall (perpendicular to the longitudinal axis) is at least 2:1, 3:1, 5:1, or 10:1.

The front and rear ends of the tubular sidewall can be formed to provide an end which defines a 90° angle with respect to the longitudinal axis, or may be formed to provide an end which defines another angle with respect to the longitudinal axis. For example, the front end may be angled to impart a desired appearance or hydrodynamic property to the lure. As described below, in a preferred embodiment, the angle of the front end of the tubular sidewall is formed to be between about 45° and 65°, preferably approximately 56° (where 90° represents a front end perpendicular to the longitudinal axis). This angle has been found to provide a desirable motion and sound when the lure is drawn through, or strikes the surface of, the water. The angle of the front end of the sidewall also in part determines the size and shape of the pocket formed by the sidewall and the front face of the lure. As described in Example 1, an appropriately shaped pocket provides a lure which has desirable hydrodynamic behavior and which causes a desirable, fish-attracting noise (a "pop") to sound when the pocket strikes a water surface.

In preferred embodiments, the body of the lure, including the sidewall and the end faces, is formed so as to include a plane of symmetry along the longitudinal axis. In other preferred embodiments, the body does not include a plane of symmetry along the longitudinal axis. An asymmetric body shape may result in unpredictable motion of the lure when the lure is drawn through the water. Such motion can simulate the appearance of a sick or injured bait fish, and thus can serve to increase the attractiveness of the lure to a target fish.

The pocket formed by the sidewall and the front face of the lure can be of any desired shape or size, depending on the dimensions and shape of the sidewall, which can be varied as noted supra. As noted above, the front end of the tubular sidewall defines the walls of the pocket, and, thus, the angle of the front end of the sidewall determines the dimensions of the edges of the pocket. When the front end of the sidewall is not formed to be perpendicular to the longitudinal axis of the lure, the pocket depth may vary according to the point at which the sidewall is measured. Furthermore, the pocket may be made to a desired depth by altering the position of the front face of the lure. In certain embodiments, the pocket has a maximum depth of one-quarter, one-half, or one inch. In preferred embodiments, the pocket has a minimum depth of 0. 1, 0.2, 0.5, one, or two centimeters. Also, in preferred embodiments, the pocket has a maximum depth of 0.1, 0.2, 0.5, one, or two centimeters. The shape of the pocket interior (for example, the pocket base) may be varied by altering the surface contour of the front face. For example, the front face may be perpendicular to the longitudinal axis of the lure, or it may form another angle with respect to the longitudinal axis. Also, the front face may be flat, or, alternatively, it may be rounded or shaped in any desired manner. In Example 1 below, and in preferred embodiments, the front face has a substantially concave surface; thus, in Example 1, the pocket has a rounded, concave base.

The pocket also comprises means for attaching a fishing line to the lure. For example, an eyelet or other attachment means may be bonded or otherwise secured (e.g., by screwing into a surface) to the front face of the lure (which defines the base of the pocket) or to the portion of the sidewall which forms the wall of the pocket. Such attachment means may consist of a hole or opening through which a fishing line can be threaded, but this is not preferred. In preferred embodiments, the means for attaching fishing line is bonded or secured to the base of the pocket. In a particularly preferred embodiment, the means for attaching fishing line comprises an eyelet screwed into (or through) the base of the pocket. Fishing line may then be attached directly to the eyelet, or may be attached through a swivel or other adapting device, as is known in the art.

With regard to the end faces, both front and rear, they may each independently be separate pieces which are bonded or attached to the sidewall, or they may be integral parts of the sidewall, as, for example, when the lure is formed by molding. When the end faces are separate pieces, they may be of any appropriate material, preferably a material which can form a water-tight seal with the sidewall. In Example 1 below, the end faces are formed from wooden dowels, cut to a desired length, and bonded to the sidewall. The end faces may be situated to form a cavity of any desired length or size, and the shape of the cavity may also be influenced by the choice of end faces.

The weight of the lure is determined, at least in part, by the size and shape of the lure, the size of the interior cavity, the materials of construction, and the number of loose weights placed in the cavity. The weight of the lure is desirably at least one ounce, and more preferably at least one-and one-half, two, three, or five ounces. In preferred embodiments, the lure weighs no more than one, two, three, five, or ten ounces. In particularly preferred embodiments, the total weight of the lure is between two and two-andone-half ounces. The weight should be selected to allow for efficient casting and retrieval of the lure, and also to assure an appropriate buoyancy, e.g., positive, negative, or neutral buoyancy. For example, the lure desirably has a negative buoyancy, and thus will tend to sink when cast into water. However, the buoyancy of the lure is preferably selected to allow the lure to travel close to the surface when drawn through the water, and to achieve the desired "porpoising" or "breaching" effect. In preferred embodiments, the density of the lure is equal to, or greater than, the density of fresh water. In certain preferred embodiments, the density of the lure is equal to, or greater than, the density of salt water.

Another feature of the invention is that the loose weights in the interior cavity are capable of movement inside the cavity. This feature gives rise to two desirable effects: the rattling sound produced upon movement of the weights, and the redistribution of weight that occurs when the weights shift. The sound produced may be muted by the addition of a soft lining to the interior cavity, or may be made louder by use of a hard material for the cavity lining. In a preferred embodiment, at least part of the interior cavity is lined with a soft material such as felt. Alternatively, the material of the weights can be varied to achieve different sound qualities. The sound should be loud enough to attract fish, but not so loud as to frighten fish, as will be apparent to the skilled artisan. One advantage of the present construction of the lure is that the rattling sound produced by the loose weights is transmitted directly through the sidewall to the water, and thus is not muffled by intervening materials.

The redistribution of weight permits long casts (when the weights are located in one end) and fish-attracting motions as the weights move when the lure is pulled through the water. Furthermore, when the lure is drawn through the water, the weights will typically not be localized at one end, but rather will be more evenly distributed throughout the length of the cavity. The number of weights and the type used will determine not only the sound produced but also the overall weight of the lure and the lure's casting and "swimming" properties (that is, the motion of the lure as it is drawn through the water by the user). Thus, it is possible to add or remove weights to attain the desired characteristics. In some embodiments, there are at least 2, five, ten, twenty, fifty, or 100 loose weights in the interior cavity. In preferred embodiments, there are at least 10 loose weights in the cavity. In some embodiments, the total weight of the added loose weights is at least one-half, one, or two ounces. In certain embodiments, the total weight of the added loose weights is less than one-half, one, two, or five ounces. In preferred embodiments, the total weight of the added loose weights is about one ounce. Furthermore, the amount of added weight is desirably no more than seventy percent, but is at least twenty percent, of the total weight of the lure. The skilled artisan will recognize that many materials in a wide range of sizes and shapes can be used as weights. For example, metallic shot (e.g., lead or steel) is available in many sizes which are suitable for use as loose weights.

The hook assembly should be attached to the rear face of the lure by an attachment means, many of which are known in the art. In preferred embodiments, the attachment means is an eyelet. In particularly preferred embodiments, the eyelet is attached to the lure in such a way as to provide for a movement of the hook assembly when the lure is drawn through the water. The inventors have found that appropriate configuration of an eyelet attached to the rear face causes a desirable waving motion of a hook assembly which is attached to the eyelet, when the lure is drawn through the water, as described in Example 1 below.

The lure of the present invention features, in preferred embodiments, a hook assembly comprising a bucktail, said hook assembly being attached to the rear face of the lure as previously described. The bucktail provides an appearance which more closely resembles a fish. The bucktail also serves to conceal a hook. For greatest effect, the bucktail should be at least 20, 40, 60, 80, 100, 120, or 150 percent of the length of the fishing lure body. In preferred embodiments, the bucktail is at least 80 percent as long as the lure body. In preferred embodiments, the bucktail is at least one, two, three, four, five, or seven inches in length. In order to effectively conceal the hook, in preferred embodiments, the bucktail is at least one-quarter, one-half, one, two, or four inches longer than any hook.

The design and attachment of fish hooks is conventional in the art. The lure of the present invention is configured, in preferred embodiments, with a tail hook. Although the hook may be of any conventional type, including single and treble hooks, in preferred embodiments, the tail hook is a single hook. In preferred embodiments, there is no hook other than the tail hook; in other words, there is no hook attached to the body at a point other than the rear body face. The use of a single tail hook allows the subject lure to be used for "catch-and-release" sport fishing, where it is desirable to release caught fish with minimal harm to the fish. Furthermore, the single tail hook is more readily concealed by the bucktail and thus is more likely to catch fish. The single hook is also less likely to become entangled with weeds or snags than is a treble hook.

The appearance of a fishing lure is of prime importance in inducing a target fish to strike at the lure. In preferred embodiments, the lure of the present invention can be painted, tinted, or modified in any way to create an appearance which will serve to attract the attention of a target fish. For example, as described in Example 1 below, the lure may be covered, in whole or in part, with paint, glitter, or reflective tape to create a suitable appearance. In certain embodiments, the rear face is covered with a reflective material, for example, reflective tape. The use of simulated eyes is another way to increase the attractiveness of the lure to fish, and in preferred embodiments, simulated eyes are painted on or affixed to the lure near the front end of the body sidewall.

Furthermore, the lure may be equipped to attract fish in other ways. For example, the use of scent attractants in conjunction with conventional lures is well established. Accordingly, the present invention contemplates the use of scent attractants or chum with the subject lure. While in certain embodiments, the interior cavity of the lure is watertight, in other embodiments of the invention, the interior cavity may contain a scent attractant which can be released, through a permeable front or rear face or the sidewall (or an opening in any surface), into the water. In embodiments which comprise an added scent attractant, the scent may be contained directly in the interior cavity, or an additional container (such as a flexible bladder) may be added to contain the attractant.

EXAMPLE 1

The body of the fishing lure described in this Example is made from ½" PVC conduit (hard "plastic" tubing) and is approximately 4½" long. The finished product weighs 2¼–2½ ounces—ideal for inshore fishing and surf casting.

The head/mouth of the lure is miter saw cut at a 56° angle, then carefully smoothed with a file or grindstone. During the lure's experimental construction stage, it was discovered that mouth angles of less than 56° caused the lure to "skate" erratically over the water's surface, thus failing to produce the popping noise desired. Lure head angles of greater than 56° resulted in a deep "cupping" action that often caused the lure to "somersault" and remain submerged for nearly half the distance of its retrieve.

The rear of the hollow lure body is a straight/right angle cut, grindstone tapered, then smoothed with fine sandpaper and steel wool. For durability and performance, the tail rim should not be reduced in width to less than 1/16".

Although several epoxy adhesive products are somewhat "waterproof", the epoxy sold under the trade name "2 Ton Clear Epoxy" is impervious to complete immersion for long periods of time, and is preferred. A self-stick felt pad is sized to fit one end of a pre-cut dowel peg (1 5/8" long, 5/8" in diameter). In the center of the peg's opposite (outer) end, a 3/32" hole is drilled to a depth of 3/8". A #12 screw hook is then used to pre-thread this head peg hole that will eventually house an epoxy reinforced, 312 brass screw eye. The screw hook provides a convenient "handle" for the head peg at it is coated with epoxy and inserted, felt end first, into the mouth (angled end) of the lure cavity.

After the peg's exposed surface is securely positioned 1/8" below the lure's lower "lip", the temporary screw hook and all excess glue is removed. If the peg turns during removal of the screw hook, it may be necessary to readjust its depth and/or re-center its position.

While the head peg's epoxy bond is curing, a one-ounce portion of small beads, such as BBs, is poured into the lure's tapered tail section. A self-stick felt pad is applied to one end of a pre-cut dowel peg (3/4" long, 5/8" in diameter), and a 3/32" hole is drilled to a depth of 3/8" in the center of the peg's opposite end. Again, a #12 screw hook may prove a convenient handle for the peg as it is coated with epoxy and inserted, felt end first, into the lure's tail cavity.

After the peg's exposed surface is positioned about 1/16" below the tapered rim, thus forming a shallow, flat-bottomed "cup", the lure should emit a light, felt-cushioned, but clearly audible sound when shaken. The noise made will be too faint to attract fish if the rattle chamber is congested; and, accordingly, the tail peg must be removed to release a few BBs from the chamber. Conversely, a number of BBs may be added to any lure capable of frightening fish via its excessive noise.

When the proper tone has been achieved, the tail peg, still wet with glue, is returned to its original position (1/16" below the rim), and the remaining recessed space is filled with epoxy to ensure lure durability and leak resistance. The lure is then put aside to dry, tail end up, for 2–3 hours.

Next, the mouth cavity's dowel peg must be covered with epoxy to fill and seal any existing gaps between wood and plastic. This is accomplished by holding the lure head upright while applying a generous amount of epoxy to the recessed area and allowing the self-flattening character of this glue to form a cup-like mouth as it dries. Thus "rounded" inside, the mouth will "pop" effectively, with no side-to-side "skating" motion, as the lure is retrieved.

After the epoxy has dried thoroughly, 6–8 hours, the glue-covered or partially filled head and tail peg holes are re-drilled, and a #12 hook is screwed into each end of the lure to prepare it for painting.

As it hangs vertically from its mouth screw hook, the lure is spray painted in three colors, all compatible in respect to adhesive quality, durability/water resistance, drying time, etc. No primer coat is necessary. A conventional, quick-drying white enamel (Krylon, for example) covers the lure's belly; its sides are then painted gold (Dupli-Color Metal Flake auto body spray paint is recommended); and finally, a blue dorsal swath is applied. (Dupli-Color Metal Flake paint is also recommended for this color.) As gold-on-white (both sides of the lure) and blue-on-gold (top stroke) overspray may occur, paint compatibility is crucial to the lure's appearance and performance.

While the lure's rear screw hook is held securely (for example, with vice-grip pliers), a liberal amount of epoxy is applied to the entire lure body, excluding its mouth cavity and dowel-pegged tail; and before the glue begins to set, it can be smoothed until all surface imperfections (e.g., bubbles, hair, lint, dust, and the like) disappear. Glitter (ultra fine to medium, gold or silver, metallic or polyester) is sprinkled generously over all surfaces of the lure before the glue dries; and to prevent runs or sags during drying time, the pliers and rear screw hook are removed, and the lure is adapted, tail end first, to a medium speed turning motor for 30–40 minutes. The mouth screw hook remains intact during this entire procedure and, as a "handle", becomes the means by which the lure can be adapted to the turning motor. After this first coat of epoxy (with glitter) has set, the lure is removed from the motor and hung, head end up, until fall bond strength is achieved (8 hours).

Next, gold and black Witchcraft Lure Eyes, 3/8" self-stick, are applied to the lure head, the front edge of each eye positioned approximately 3/4" from the angled edge of the mouth cavity. Depending upon product availability, silver and black eyes may also be used. After the eyes have been carefully aligned, a second coat of epoxy, thoroughly covering the eyes and first coat glitter, is applied; and the lure is again motor turned for 30–40 minutes (see above). A third coat of epoxy can be applied after various surface imperfections have been sanded smooth with fine sandpaper or steel wool. However, although a third coat of glue will restore gloss to lightly sanded epoxy undercoats, it will only highlight errors of paint removal caused by excessive sanding.

Attention is given to the decorative (and thus functional) aspects of the pocket or mouth. The screw hook is removed, and a relatively small amount of epoxy is applied (for example, with a sponge-tipped makeup applicator) into the mouth cavity and spread lightly on the area's outer rim ("lips"). Copper or gold glitter (gold glitter is usually more readily available) is then poured liberally into the mouth cavity and onto the lips. Excess glitter, that which does not adhere to the glue, is shaken from the lure and returned to its container. Mouth end up, the lure is set aside to dry until a third and final (glitter covering) coat of epoxy is applied.

The final stages of construction are devoted primarily to the lure's tail section. A thin coat of epoxy is applied to this dowel-pegged area, and a dense layer of blue, gold, and silver glitter, mixed together in equal amounts, is sprinkled into the wet glue and tamped firm as the mixture begins to set. Throughout this simple but important procedure, care must be taken to prevent the flow of excess glue or glitter onto finished areas of the lure.

After the epoxy has dried to the touch, 2–3 hours, a round, 1/2" in diameter selfstick patch of reflective tape (e.g., such as is sold under the trade name Witchcraft Decorator Tape, available in silver or gold, hologram or prism, varieties) is centered on the lure's rear face, thus leaving a 1/8" circumferential band of glitter that complements, in respect to both color and flash, the reflective tape. The "flash patch" used is cut from a rectangular sheet of the reflective tape with a homemade or commercially available punch. For added strength and durability, another coat of epoxy, thick enough to cover and seal both glitter and tape, is applied to the entire rear end of the lure. Again, any excess glue must be removed before it begins to set. The lure is then put aside to dry, tail end up, for several hours.

A size 7/10 bucktail (Andrus Teaser Hook) is also treated with epoxy and glitter. The glue is applied to cover the hook's entire thread-wound head; and glitter (such as the blue-gold-silver mixture described previously) is sprinkled onto the epoxy-covered bucktail head and pressed firm while the glue is setting. After sufficient drying time, a second coat of epoxy is used to smooth, seal, and add gloss to the glitter-reinforced head thread before the hook is attached to the lure. Any number of bucktail "teaser" hooks may be prepared before, during, or after the lure's assembly.

As both ends of the lure are covered and sealed—the front face with glitter and epoxy, the rear face with glitter, flash patch, and epoxy—it is again necessary to re-drill the head and tail peg holes to a depth of 3/8" with a 3/32" drill bit. This accomplished, a #12 brass screw eye, its threads coated with epoxy, is turned slowly with smooth-jawed long-nosed pliers into the mouth hole until only the top arc of the eye projects 1/16"–1/8" above the angled cut of the lure head. If the eye is screwed too deeply into the mouth cavity, the lure will still "pop" effectively, but the means by which it is attached to the angler's line (e.g., tied or clipped) may prove awkward. Perhaps most importantly, the eye must be secured in vertical position, top of mouth cavity to bottom, for proper lure action.

Finally, a #12 brass screw eye, its threads coated with epoxy for maximum holding strength, is turned slowly with smooth-jawed pliers into rear face of the lure. This fixture, however, must be secured in horizontal position to ensure the side-to-side "waving" motion of the bucktail/teaser hook to which the eye is attached with a #5 (preferred) or #6 split ring. Also, because of the screw eye's substantial width, the split ring that connects it to the bucktail hook should be opened and turned with split ring pliers.)

The completed lure is very durable, but it may eventually exhibit some natural "battle scars" (teeth marks, etc.) which may be removed with a thin coat of 2-Ton Clear Epoxy applied to the entire lure body, regardless of the size or specific location of the area to be repaired. The lure may be "turned" by hand for 20–30 minutes until the glue begins to set.

EXAMPLE 2

From long cast to rhythmic retrieve, the lure of the present invention (also referred to herein as the "plug") is easily used—so simple, in fact, that common "mistakes" (reeling too fast or too slowly, breaking the cadence of the retrieve, or even "drowning" the plug, etc.) will often land fish not inclined to strike when not feeding. The lure of the present invention sinks before "swimming" ; but it is not necessary to arrest its flight before splashdown, for it has been proven effective underwater even before the plug is brought to the surface.

Ideally, in calm or windy conditions, there would be no slack line between lure and angler after the cast. Such is not the case, of course; but in the few seconds required to collect this line, the lure is already "working".

Lures according to the invention have a unique, multiple weight and sound system. All of the loose weights are concentrated in the tail section during the cast and splashdown. The momentum of the cast, combined with the lure's tail/"weight forward" design, actually causes the plug to drift away from the angler as it sinks. Its mobile weights still occupying the rearmost part of the plug, the lure does not follow the same angle of trajectory upon retrieve as it does when entering the water. Instead, the plug "bobs" initially, its large "teaser" billowing wide, as it "tail walks" its way to the surface where it levels out to commence its rhythmic popping and rattling action.

The cast itself and the retrieve are fundamental. As the plug strikes the water, the rod should be held at an angle of approximately 25–35 degrees. (The longer the cast, the greater the angle is a general rule to be followed.) While the plug sinks, drifting slowly away from the angler, slack line is reeled in rapidly until the popper appears on the surface. (It is sometimes not necessary for the angler to actually see the plug, especially in rough surf; for after just a few casts, he will have developed a "feel" for the lure's surface action.)

At this point, the rod tip is lowered somewhat, and reeling speed is reduced just enough to keep the plug afloat. Essentially, the plug's characteristics (for example, weight and sound) dictate the rate of retrieve; and this speed, as tested, will always be ideal for game fish—striped bass, bluefish, etc. At regular intervals, every 2–3 revolutions of the reel handle, the rod tip is jerked upward 2–3 feet, perhaps higher in turbulent surf, thus causing the plug to "pop" and rattle as it accelerates abruptly for a short distance. The angler is advised to maintain this reel-and-jerk cadence throughout the retrieve, for the lure has caught many fish surprisingly close to shore.

Other embodiments are within the following claims.

What is claimed is:

1. A fish lure comprising:

a body having a tubular sidewall with a front opening and a rear opening, a front face and a rear face, which in combination define an interior cavity having a front end and a rear end; said interior cavity being lined with felt liners only on said front end and said rear end of said interior cavity to mute sounds emanating therefrom, said front face being recessed with respect to said front opening of said tubular sidewall so as to form a pocket, a base of said pocket being formed by said front face and a wall of said pocket being formed by said tubular sidewall;

means disposed within said pocket for attaching fishing line;

a hook assembly pivotally attached to said rear face; and a plurality of loose weights disposed within said interior cavity of said body.

2. A lure of claim 1, wherein said plurality of loose weights comprises at least 2, five, ten, twenty, fifty, or 100 loose weights.

3. A lure of claim 1, wherein said front opening of said sidewall is formed so as to define an angle other than 90° with respect to a longitudinal axis of said lure.

4. A lure of claim 3, wherein said angle is between about 45° and 65°.

5. A lure of claim 1, wherein said base of said pocket is substantially concave.

6. A lure of claim 1, wherein said means for attaching fishing line is an eyelet.

7. A lure of claim 1, wherein said sidewall is substantially circular in cross-section.

8. A lure of claim 1, wherein the total weight of said loose weights is at least one-half, one, or two ounces.

9. A lure of claim 1, wherein said hook assembly comprises a bucktail.

10. A lure of claim 9, wherein said bucktail is at least one-half centimeter longer than any hook.

11. A lure of claim 1, wherein said pocket is operably configured to produce a popping sound upon contact with a water surface.

12. A lure of claim 1, wherein said sidewall comprises a plastic material.

13. A lure of claim 12, wherein said plastic material is polyvinyl chloride.

14. A lure of claim 1, wherein the density of the lure is equal to, or greater than, the density of fresh water.

15. The lure of claim 1, wherein the density of the lure is equal to, or greater than, the density of salt water.

16. The lure of claim 1, wherein a ratio of a body length along a longitudinal axis to a transverse diameter of said sidewall is at least 2:1, 3:1, 5:1, or 10:1.

17. The lure of claim 1, wherein said pocket has a minimum depth of 0.1, 0.2, 0.5, one, or two centimeters.

18. The lure of claim 1, wherein a length of said cavity is more than thirty percent of a length of the body but is less than eighty percent of a length of the body.

19. The lure of claim 1, wherein a length of said sidewall is at least three, six, ten, fifteen, or twenty-five centimeters.

* * * * *